Jan. 14, 1969    E. KUHNLE ET AL    3,421,595

BALANCE-BEAM SUSPENSION

Original Filed Feb. 19, 1965    Sheet 1 of 3

Inventors:
ERNST KUHNLE
JOSEF SCHWARZ
By: Holte and Holte
ATTORNEYS

United States Patent Office 3,421,595
Patented Jan. 14, 1969

3,421,595
BALANCE-BEAM SUSPENSION
Ernest Kuhnle and Josef Schwarz, Balingen, Wurttemberg, Germany, assignors to Bizerba-Werke Wilhelm Kraut KG., Balingen, Wurttemberg, Germany
Original application Feb. 19, 1965, Ser. No. 433,858. Divided and this application Apr. 10, 1967, Ser. No. 659,242
Claims priority, application Germany, Feb. 20, 1964, B 75,506; Aug. 20, 1964, B 78,190
U.S. Cl. 177—261         7 Claims
Int. Cl. G01g 21/04

ABSTRACT OF THE DISCLOSURE

Scale bearing comprising a knife-edge supported on a pan which permits rotational movement of the knife-edge about an axis perpendicular to the knife-edge, said pan being supported in a manner to allow lateral movement of the pan in a direction perpendicular to the knife edge, and elements extending from the beam supporting the knife-edge and from the frame supporting the pan, said elements engaged in an interlocking relationship and permitting relative rotation of beam with respect to the frame about an axis colinear with the knife edge.

---

This is a division of application Ser. No. 433,858, filed Feb. 19, 1965.

The present invention relates to balance-beam suspensions, and more particularly to a suspension incorporating a knife-edge rigid with the balance beam and a pan for the knife-edge arranged on the balance frame.

The knife-edge-pan suspension is chosen to attain a sensitivity as required by law. The knife-edge is in the form of a hardened knife ground into the shape of an acute angle, and resting with its contact edge on the ground pan.

The ideal shape of a pan is that of a plane, hardened body. It is easy to manufacture such pans with the required hardness and satisfactory flat surface. However, such flat pans are practically never used except for analytical balances which have but a single balance beam and a single pan suspension. With these balances, the beam, normally in an inoperative arresting position, is brought with the knife-edge provided thereon onto the plane pan so that measurements may commence.

In balances where several beams cooperate with a plurality of knife-edge-pan suspensions, the beams must be given a constant positioning which, however, cannot be achieved with plane pans. This is the reason why the usual multi-beam balances are fitted with pans in the form of prisms. The knife-edge rests on the ground of such a prism pan and is, therefore, secured in its position. Nevertheless, the knife-edge is due to lateral shift owing to the influence of lateral forces; hence, the contact edge does not rest on the pan ground any more but on one of the pan flanks.

The above-described lateral shift frequently occurs with balance systems fitted with parallel guides. The deficiency can be prevented or remedied only by making the beams correspondingly sturdier.

It is one of the objects of the present invention to prevent the lateral shift of balance systems without adversely influencing the measuring accuracy; or, by maintaining the same within the prescribed limits.

It is another object to use plane suspension pans in balances having several cooperating beams, wherein these pans, hitherto only used in single-beam balances, could not be adopted so far.

It is yet another object of the invention to provide structural elements in a balance, the distance of which necessarily limits any possible lateral shift of the knife-edge with respect to its pan.

According to one of the major features of the invention, a knife-edge is provided which is rigid with the balance beam, a pan for said knife-edge is arranged on the framework, while a cylindrical guide member is similarly made rigid with the balance beam, the axis of which coincides with the contact line of the knife-edge. This guide member is arranged between a pair of parallel guiding edges, their distance being determined by the maximum admissible lateral shift of the knife-edge with respect to the balance pan. The guide member is preferably held by the intermediary of intermediate elements journaled thereat in a rotatable or rollable manner.

Since the knife-edges cannot be made with absolutely acute contact edges and, furthermore, a rounding off is necessary for maintaining the measuring accuracy for a prolonged period, sufficient play has to be allowed between the guiding edges and the cylindrical members for the shift or roll caused by the rounding off of the knife-edges.

It should be noted that balance-beam suspensions not directly connected with the indicating system are immune to the adverse effects of the rolling motion. With systems, however, wherein indicator means are also supported by the balance-beam suspension, this motion noticeably affects the result of measurement. If the rolling motion is excluded or compensated for by means of fixation of the cylindrical member free from play, the knife-edge has to slide on the pan which adversely influences the measurement. If, on the other hand, the plane pan is supported so that it can shift laterally and take over the rolling motion due to the rounding off of the knife-edge, play can be eliminated between the guiding edges and the cylindrical member, and with respect to the balance beam.

It is another important object of the present invention to provide a pan suspension for balance of the type discussed herein, which satisfies the above-mentioned requirements.

Accordingly, another important feature of the invention relates to a novel structure wherein the balance pan is made displaceable in a direction perpendicular and diagonal to the extension of the knife-edge so as to allow for a lateral shift.

Preferably, the pan is lodged in a bowl-shaped support surrounding the former with some play, the support in turn being displaceable on the balance frame whereby the required shift is made possible. This expedient allows the use of pans the lower face of which has the form of a cylinder mantle section so that the pan is capable of adjusting to the inclination of the contact edge.

According to an optional feature, resetting means are provided for at least indirectly returning the pan to its initial position. This allows the pan and the support to be brought back to the optimum median position.

Peferably the balance pan is suspended on a hanger attachment, allowing both lateral shift and return of said pan. By this measure, gravity takes over the role of returning the shifted element to the initial position.

Alternatively, a swinging attachment may be provided for the pan, performing in a manner similar to the aforementioned hanger attachment, for both lateral shift and return of the displaced element.

Other objects and advantages of the invention will be appreciated and more fully understood with reference to the following detailed description, when considered with the accompanying drawings, wherein.

Figure 1:
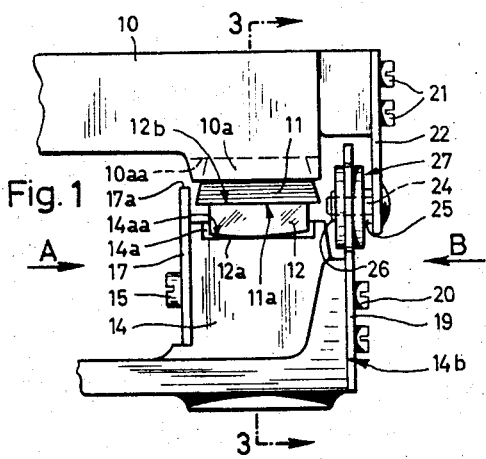
FIG. 1 is a side view of a balance-beam suspension according to the invention.
Figure 2:
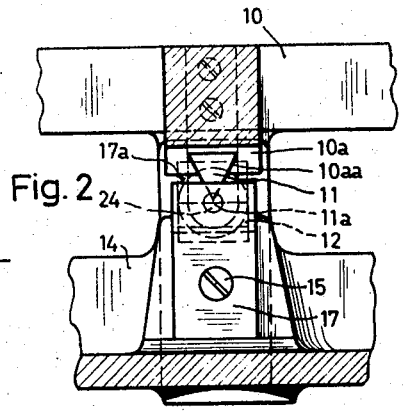
FIG. 2 is a partly sectional view of the suspension, taken in direction of arrow A in FIG. 1.

A preferred embodiment of the balance-beam suspension according to the present invention is illustrated in FIGS. 1 through 4. A balance beam or lever 10 is broken away for the sake of clarity. In an end portion, the beam has a projection 10a which has a support 10aa provided therein; an elongated knife-edge 11 of triangular cross-section is inserted in said support. Contact edge 11a of the knife-edge rests on a plane pan 12, the lower face 12a of which is in the form of a cylinder mantle section, as shown. The geometrical axis of the cylinder is horizontal, and perpendicular to the plane of the knife-edge contact edge when in the rest position.

The pan 12 rests on a substantially horizontal surface 14aa of a recess 14a provided in a counterpart 14 rigid with the balance frame (not shown). The pan 12 is allowed to roll within limits on the surface 14aa so that the upper surface 12b of the pan can adjust itself to the direction of the contact edge 11a. A knife-edge butt-plate 17 is secured, by means of a screw 15, to the counterpart 14; the upper edge 17a of said plate lies above the pan surface 12b.

Figure 4:
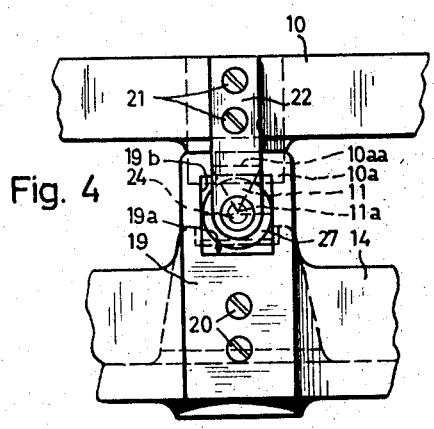
FIG. 4 is another view of the suspension, taken in direction of arrow B in FIG. 1.

On the other side of counterpart 14, a guide plate 19 is attached to the lateral surface 14b by way of screws 20. FIG. 4 shows best how the plate 19 has therein a rectangular cut-out 19a. Above and close to the plate 19, the balance beam 10 has attached thereto, by means of screws 21, a support 22 reaching down beyond the center of the cut-out 19a.

A bolt 24 traverses the support 22 and serves as a guide member, as will be explained in more detail. Bolt 24 carries a washer 25 and a circlip 26 as well as an inner ring 27a (FIG. 5) a ball bearing 27, the plate 19 having an outer ring 27b of the bearing secured thereto. The geometrical axis of the bearing 27 is exactly level with the contact edge 11a of the knife-edge 11. There is hardly any play between the periphery of the outer ring 27b and the substantially vertical guiding edges 19b of the cut-out 19a.

Figure 5:
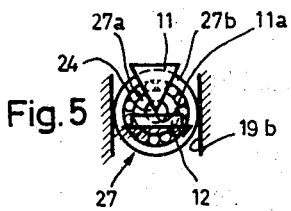
FIG. 5 is a schematic illustration of an inventive suspension having a plane pan, as shown in FIGS. 1–4.

The more important elements of the preferred suspension with a plane pan are schematically shown again in FIG. 5. For the sake of clarity, a few elements (like 27a, 27b) have been shown in FIG. 5 alone.

Figure 6:
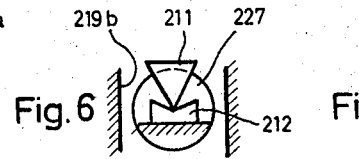
FIG. 6 is a similar schematic illustration of a suspension with a prismatic pan.
Figure 7:
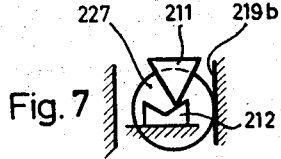
FIG. 7 is an illustration like that of FIG. 6 but with the knife-edge member shifted to one of the guiding edges.

FIGS. 6 and 7 are similar schematic illustrations of an arrangement according to the invention wherein a knife-edge 211 is supported by a prismatic pan 212 rigid with the frame. A cylindrical member 227, rigid with the beam, may have the form of a roller bearing or of a cylinder (only schematically indicated). The play between the member 227 and the guiding edges 219b (forming part of a plate similar to plate 19 of the previous embodiment but not identified with a numeral) corresponds to the maximum knife-edge shift that is admissible in the system.

FIG. 7 illustrates the same system in which, however, the knife-edge 211 is shifted from its normal position on effect of lateral force components. The member 227 being rigid with the edge 211, it moves along with the latter in its translation, and abuts on the right-hand edge 219b, as viewed in FIG. 7. This limits the shift path; nevertheless, the knife-edge 211 is free to tilt if the member 227 is made in the form of a bearing.

Figure 8:
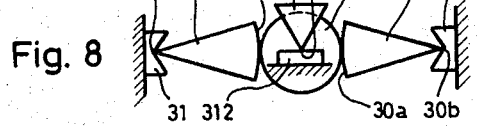
FIG. 8 is a schematic illustration of another suspension according to the invention, having intermediate guide elements with the shape of a circular sector.

FIG. 8 is a schematic example of another balance-beam suspension having a rigid cylindrical guide member 327, not in the form of a bearing, which is guided between peripheral arc surfaces or edges 30a of two substantially horizontally arranged guide elements 30. As illustrated, these elements have the shape of circular sectors and are held in prismatic pans, rigid with the balance frame, by way of their contact edges 30b. The pans 31 are capable of taking up lateral forces.

This variant is characterized by a minimum of play and by very low frictional forces. The system is, of course, symmetrical with respect to the contact edge 311a of a triangular knife-edge 311. The latter is rigid with the guide member 327; the axis of member 327 coincides with the contact line 311a. As has been shown before, edge 311 rests on a plane pan 312.

In the preceding portion of the specification, cylindrical guide members have been described and illustrated. These members may, however, form portions of a cylinder, as will be seen in the following, as long as their peripheral surfaces are not required for transmitting lateral forces.

Figure 3:
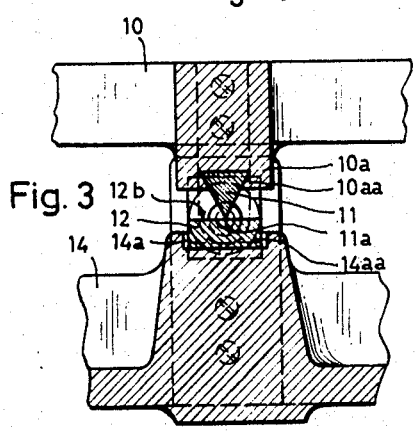
FIG. 3 is a sectional view taken along line 3—3 of FIG. 1.
Figure 9:
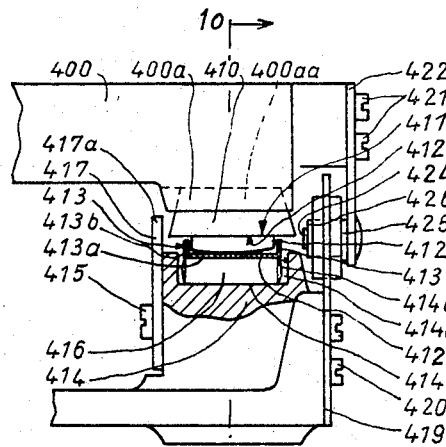
FIG. 9 is again a side view, somewhat similar to FIG. 1, of an alternative suspension according to the invention, partly in section.
Figure 10:
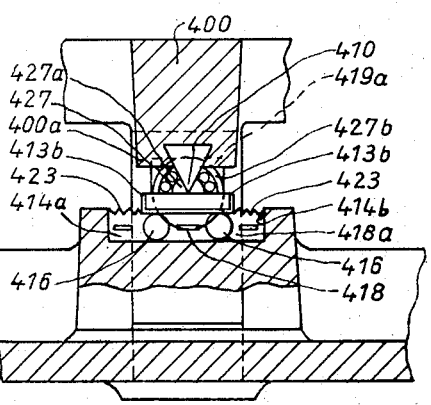
FIG. 10 is a sectional view, somewhat similar to FIG. 3, and taken along line 10—10 of FIG. 9.

FIGS. 9 and 10, to be described in the following paragraphs, as similar in some details to the respective views of FIGS. 1 and 3. A usual balance beam 400 is shown (broken away on the left-hand side, as viewed in the drawing), having a projection 400a and a support 400aa therein; an elongated knife-edge 410 of triangular cross-section is received therein. The contact edge 411a rests on the plane top surface 412b of a pan 412. The lower surface of the latter has the shape of a cylinder mantle section, as shown at 412a, the geometric axis of the imaginary cylinder being horizontal and perpendicular with respect to the edge 411a.

The pan 412 rests on a support 413 having a planar bottom 413a and four vertical walls 413b. Between certain limits, the pan is free to roll on the bottom 413a, whereby it is free to adjust itself with its surface 412b to the direction of the edge 411a. The support 413 itself is held by two rollers 416 in a displaceable manner. These rollers, in turn, slide along a horizontal surface 414aa in a recess 414a of a counterpart 414. The rollers 416 are guided in recesses 418a of a roller cage 418 which is, in turn, guided in the recess 414a.

Two horizontal tension springs 423 are attached on either side, on the one hand, to the lateral walls 413b parallel with the contact edge and, on the other hand, to the recess 414a of the opposite side walls. The support 413 is, thus, maintained in a substantially median position by means of the springs 423. The counterpart 414 has attached thereto an edge butt-plate 417, by means of a screw 415, the uper edge 417a of the plate 417 protruding above the pan surface 412b.

Opposite the butt-plate 417, a side wall 414b of the counterpart 414 has a guide plate 419 secured thereto by way of screws 420. The plate 419 has a rectangular cut-out 419a. Above and adjacent to the plate, a support 422 is attached to the beam 400 by the aid of screws 421, the support depending beyond the center of the cut-out 419a.

A bolt 424 traverses the support 422 and serves as a guide member. Bolt 424 carries a washer 425 and a circlip 426 as well as an inner ring 427a of a bearing 427, the plate 419 having an outer ring 427b of the bearing secured thereto. The geometrical axis of the bearing 427 is exactly level with the contact edge 411a of the knife-edge 411. There is hardly any play between the periphery of the outer ring 427b and the substantially vertical guiding edges 419b of the cut-out 419a.

When the balance is in operation, the contact edge 411a, which is not perfectly sharp but somewhat rounded off, touches the surface 412b of pan 412 in all angular positions of the knife-edge 411 with a different contact-edge line (mantle line of the cylindrical roundness) 411a. However, the center of the inclination is determined by the geometrical axis of the cylindrical bolt 424 and the latter is kept free from play, different lateral shift values would result, depending upon the particular angle of inclination, between the line 411a which happens to be in contact at the given moment. This, however, counteracts the guidance by the edge 419b; this is why a rolling motion takes place during which the suport 413 is laterally shifted together with the pan 412 until the prevailing knife-edge mantle line registers with the rigid inclination center. The springs 423 exert a return force so that the support 413 always returns to its intermediate position as soon as the balance beam assumes its normal position.

Figure 11:
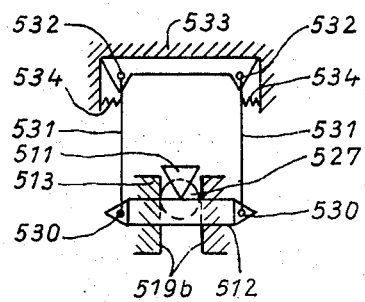
FIGS. 11 through 18 are again schematic illustrations of inventive suspension embodiments incorporating hanging and swinging attachments, respectively.

FIGS. 11 through 18 are further schematic illustrations, conventional in the art of balance technology, and to be described hereunder as follows:

FIG. 11 shows a pan 512 suspended on two parallel guides 531 by the intermediary of joints 530; the guides are, inturn, suspended in joints 532. Between the upper ends of guides 531, as illustrated, and a frame portion 533, tension springs 534 are inserted which exert a return force on the guides 531 whenever the pan 512 is displaced. The knife-edge is identified 511, the pair of guiding edges is marked 519b, while the cylindrical member is shown at 527; these are substantial equivalents of the previously described elements. In the following FIGS. 12 through 14, these known elements are equally illustrated but not denoted by reference numerals any more.

Figure 12:
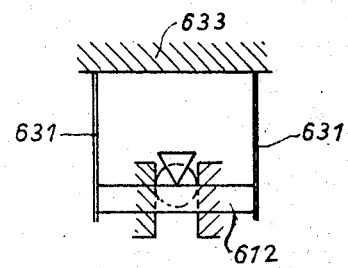

In FIG. 12, both the frame 633 and a pan 612 are connected to respective ends of rigidly attached leaf or plate, springs 631. The latter assume the role of the spring-biased guides 531 of the previous embodiment.

Figure 13:
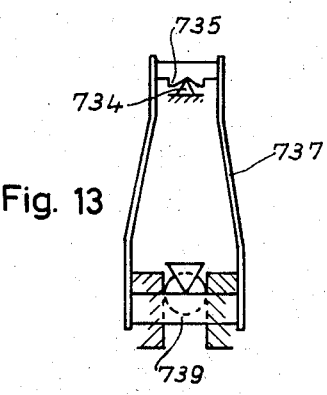
Figure 14:
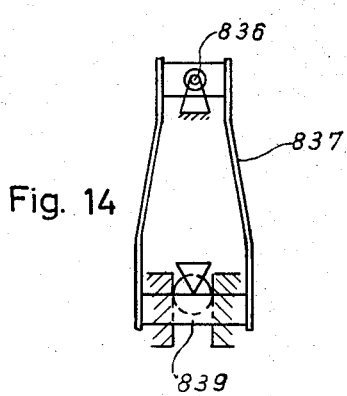

FIGS. 13 and 14 illustrate respective hanger attachments or linkages 737 and 837, rigidly connected with the respective pans 739 and 839 at their lower ends, while the upper ends are as follows: In FIG. 13, an interconnecting member has a pan 735 therein which rests on a knife-edge 734; in FIG. 14, on the other hand, the interconnecting member is supported by a ball bearing 836 or like swingably supported element.

Figures 15, 16:
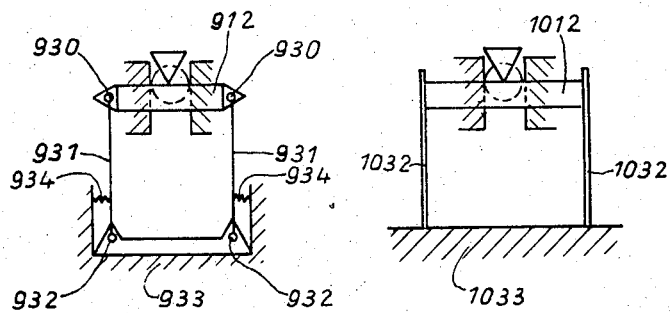

FIGS. 15 and 16 are kinematic reversals of the respective, previously discussed FIGS. 11 and 12. In FIG. 15, guides 931 are supported by the stationary joints 932 and are linked to pan 912 by the intermediary of joints 930. Here, again, springs 934 are interposed between the frame 933 and the guides 931. In FIG. 16, leaf springs 1032 rest on, and are rigidly connected to the frame 1033 as well as to pan 1012. No further explanation of these variants is deemed necessary in view of the preceding explanations.

Figures 17, 18:
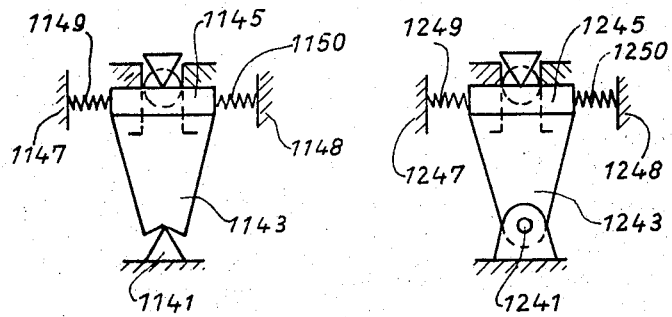

FIGS. 17 and 18 illustrate, in a way, reversals of the respective embodiments shown in FIGS. 13 and 14. Swinging attachments 1143 and 1243 are rigid with the respective pans 1145 and 1245 at their upper ends, springs 1149, 1150 and 1249, 1250 being interposed between these pans and the corresponding frame portions 1147, 1148 and 1247, 1248. The lower ends of these embodiments are as follows: In FIG. 17, attachment 1143 is formed with a pan which rests on a stationary knife-edge 1141; in FIG. 18, on the other hand, a ball bearing 1241 or similar pivotable element is interposed. Like in the structures shown in and described in connection with FIGS. 9 and 10, 11 and 15, the biasing action of the springs is used to reset the system to the normal once it has been shifted one way or the other.

What we claim is:

1. In a balance having a stationary frame, at least one pan means rigid with said frame, at least one pivotal balance beam, knife-edge means rigid with said balance beam and supported for pivotal movement by said pan means, the combination comprising first support means attached to said balance beam, second support means attached to said frame, portions of said support means extending in adjacent relationship toward the plane of contact between said knife-edge means and said pan means, a guide member pivotally interposed between said support means portions, the pivoting axis of said guide member coinciding with the line of contact between said knife-edge means and said pan means, and means interposed between said frame and said pan means for allowing lateral shift of said pan means in a perpendicular direction transversal to the direction of said knife-edge means.

2. In a balance, the combination according to claim 1, wherein said means allowing lateral shift includes a bowl-shaped support and rolling means interposed between said frame and said support for rolling movement of said pan means with respect to said frame.

3. In a balance, the combination according to claim 2, wherein said frame has a recess therein opposite said knife-edge means, said rolling means being displaceable between the side walls of said recess.

4. In a balance, the combination according to claim 1, wherein said means allowing lateral shift includes biasing means acting on said pan means for restoring the latter to a normal position.

5. In a balance, the combination according to claim 1, wherein said means allowing lateral shift includes a hanger attachment between said frame and said pan means.

6. In a balance, the combination according to claim 5, further comprising biasing means acting on said hanger attachment for restoring the latter to a normal position with respect to said frame.

7. In a balance, the combination according to claim 5, wherein said hanger attachment is in the form of leaf springs for supporting said pan means from said frame.

References Cited

UNITED STATES PATENTS

| 690,480 | 1/1902 | Strubler | 177—246 |
| 3,387,898 | 6/1968 | Hadley | 308—2 |

FOREIGN PATENTS

| 62,654 | 8/1944 | Denmark. |
| 865,543 | 12/1952 | Germany. |
| 313,405 | 4/1956 | Switzerland. |

RICHARD B. WILKINSON, *Primary Examiner.*

GEO. H. MILLER, JR., *Assistant Examiner.*

U.S. Cl. X.R.

308—2